United States Patent
Gray et al.

(10) Patent No.: US 12,010,143 B2
(45) Date of Patent: Jun. 11, 2024

(54) BULK DATA TRANSFERS VIA TRANSPORT LAYER SECURITY PROTOCOL

(71) Applicant: International Business Machines Corporation, Armonk, NY (US)

(72) Inventors: Michael W. Gray, Guanaba (AU); Narayana Aditya Madineni, Southport (AU); Leigh S. McLean, Nerang (AU); Luvita Burgess, Brisbane (AU)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 17/445,842

(22) Filed: Aug. 25, 2021

(65) Prior Publication Data

US 2023/0080104 A1  Mar. 16, 2023

(51) Int. Cl.
*H04L 29/06* (2006.01)
*H04L 9/40* (2022.01)
*H04L 67/06* (2022.01)

(52) U.S. Cl.
CPC ........ *H04L 63/166* (2013.01); *H04L 63/0435* (2013.01); *H04L 63/20* (2013.01); *H04L 67/06* (2013.01)

(58) Field of Classification Search
CPC ... H04L 63/166; H04L 63/0435; H04L 63/20; H04L 67/06
See application file for complete search history.

(56) References Cited

U.S. PATENT DOCUMENTS

| | | | |
|---|---|---|---|
| 9,317,213 B1* | 4/2016 | Gupta | G06F 3/067 |
| 11,569,979 B2* | 1/2023 | Khanna | H04L 9/0625 |
| 2011/0123020 A1* | 5/2011 | Choi | H04L 9/0637 |
| | | | 380/28 |
| 2011/0154454 A1* | 6/2011 | Frelechoux | H04L 63/0892 |
| | | | 726/5 |
| 2012/0079285 A1* | 3/2012 | Gueron | G06F 21/52 |
| | | | 713/190 |

(Continued)

FOREIGN PATENT DOCUMENTS

| | | | | |
|---|---|---|---|---|
| CN | 103200072 A | * | 7/2013 | |
| CN | 107888373 A | * | 4/2018 | ........... H04L 9/0631 |
| KR | 20180090019 A | * | 8/2018 | |

OTHER PUBLICATIONS

"Improving OpenSSL Performance", Last Updated:May 26, 2015, 11 pages, <https://software.intel.com/content/www/us/en/develop/articles/improving-openssl-performance.html>.

(Continued)

*Primary Examiner* — Khalid M Almaghayreh
(74) *Attorney, Agent, or Firm* — Stephen R. Yoder

(57) ABSTRACT

Establishing a transfer mode between devices for large bulk records over a TLS protocol by fragmenting an encrypted bulk record into a set of pre-defined block sizes for convenient transfer. The pre-defined block sizes are specifically sized to indicate a beginning and an end of the transfer of the associated blocks making up the large bulk record. A middle box is unaware of the association between the blocks and permits transfer according to the maximum transmission unit of the transport layer security (TLS) protocol. The fragmented bulk record is reconstructed and decrypted for use after the transfer.

9 Claims, 4 Drawing Sheets

(56) References Cited

U.S. PATENT DOCUMENTS

| | | | |
|---|---|---|---|
| 2013/0177156 A1* | 7/2013 | Ryan | H04L 9/0822 |
| | | | 380/277 |
| 2014/0181610 A1 | 6/2014 | Munson | |
| 2015/0149763 A1* | 5/2015 | Kamara | H04W 4/02 |
| | | | 713/150 |
| 2016/0218864 A1* | 7/2016 | Mutou | H04L 9/0825 |
| 2017/0091463 A1* | 3/2017 | Lindteigen | G06F 21/602 |
| 2020/0028946 A1* | 1/2020 | Vora | H04L 1/1874 |

OTHER PUBLICATIONS

Benjamin, D., "Applying Generate Random Extensions And Sustain Extensibility (GREASE) to TLS Extensibility", RFC 8701, Jan. 2020, 12 pages.

Bouius, Derek, "Accelerating Cryptographic Operations in the TLS Protocol", @2021 Synopsys, Inc., 12 pages, <https://www.synopsys.com/designware-ip/technical-bulletin/accelerating-cryptographic-operations.html>.

Dierks et al., "The Transport Layer Security (TLS) Protocol Version 1.2", Aug. 2008, 104 p. <https://datatracker.ietf.org/doc/html/rfc5246#page-19>.

Hani et al., "Hardware Acceleration of OpenSSL cryptographic functions for high-performance Internet Security", 2010 International Conference on Intelligent Systems, Modelling and Simulation, 6 pages.

\* cited by examiner

BULK DATA TRANSFERS VIA TRANSPORT LAYER SECURITY PROTOCOL

BACKGROUND

The present invention relates generally to the field of bulk transfer over transport layer security (TLS) protocol, and more particularly to performing above-maximum transmission unit data transfers.

Transport Layer Security (TLS) is a cryptographic protocol designed to provide communications security over a networked computers system. Several versions of the protocol are widely used in applications such as email, instant messaging, and voice-over-IP. The TLS most commonly seen is the version used as the security layer in hypertext transfer protocol secure (HTTPS). The TLS protocol provides privacy and data integrity between two or more communicating computer applications by running in the application layer of the internet. TLS protocol is composed of two layers: (i) the TLS record protocol; and (ii) the TLS handshake protocol.

A middlebox is a computer networking device that transforms, inspects, filters, and/or manipulates network traffic for purposes other than packet forwarding. Examples of middleboxes include firewalls, network address translators (NATs), load balancers, and deep packet inspection (DPI) boxes.

The TLS protocol includes several points of extensibility, including the list of cipher suites and several lists of extensions. The values transmitted in these lists identify implementation capabilities. TLS follows a model where one side, usually the client, advertises capabilities, and the peer, usually the server, selects them. The responding side must ignore unknown values so that new capabilities may be introduced to the ecosystem while maintaining interoperability. The acronym GREASE (Generate Random Extensions And Sustain Extensibility) refers to a mechanism to prevent extensibility failures in the TLS ecosystem. GREASE reserves a set of TLS protocol values that may be advertised to ensure peers correctly handle unknown values.

SUMMARY

In one aspect of the present invention, a method, a computer program product, and a system includes: dividing an encrypted record into a set of fragments including equal-size fragments and one unequal size; transmitting each fragment of the set of fragments from a first device to a second device via transfer layer security (TLS) protocol over a communications network; assembling the set of fragments to create the encrypted record; and decrypting the encrypted record for processing by the second device. The equal-size fragments are exactly the size of the maximum transmission unit (MTU) according to the TLS protocol.

In another aspect of the present invention, a method, a computer program product, and a system includes: establishing a transmission mode for transmitting records exceeding the MTU by a handshake operation between the first device and the second device. The encrypted record is a size that exceeds the MTU.

In yet another aspect of the present invention, a method, a computer program product, and a system includes: identifying a bulk data record for transmission from the first device to the second device; determining the bulk data record is a size that exceeds the MTU; and encrypting the bulk data record to create the encrypted record.

In still another aspect of the present invention, a method, a computer program product, and a system includes: transmitting each fragment of the set of fragments includes an order of transmission causing the unequal-size fragment to be transmitted last; determining an end of transmission of the set of fragments by receipt of the unequal-size fragment; and assembling the set of fragments is performed responsive to determining the end of transmission.

DETAILED DESCRIPTION

Figure 1:
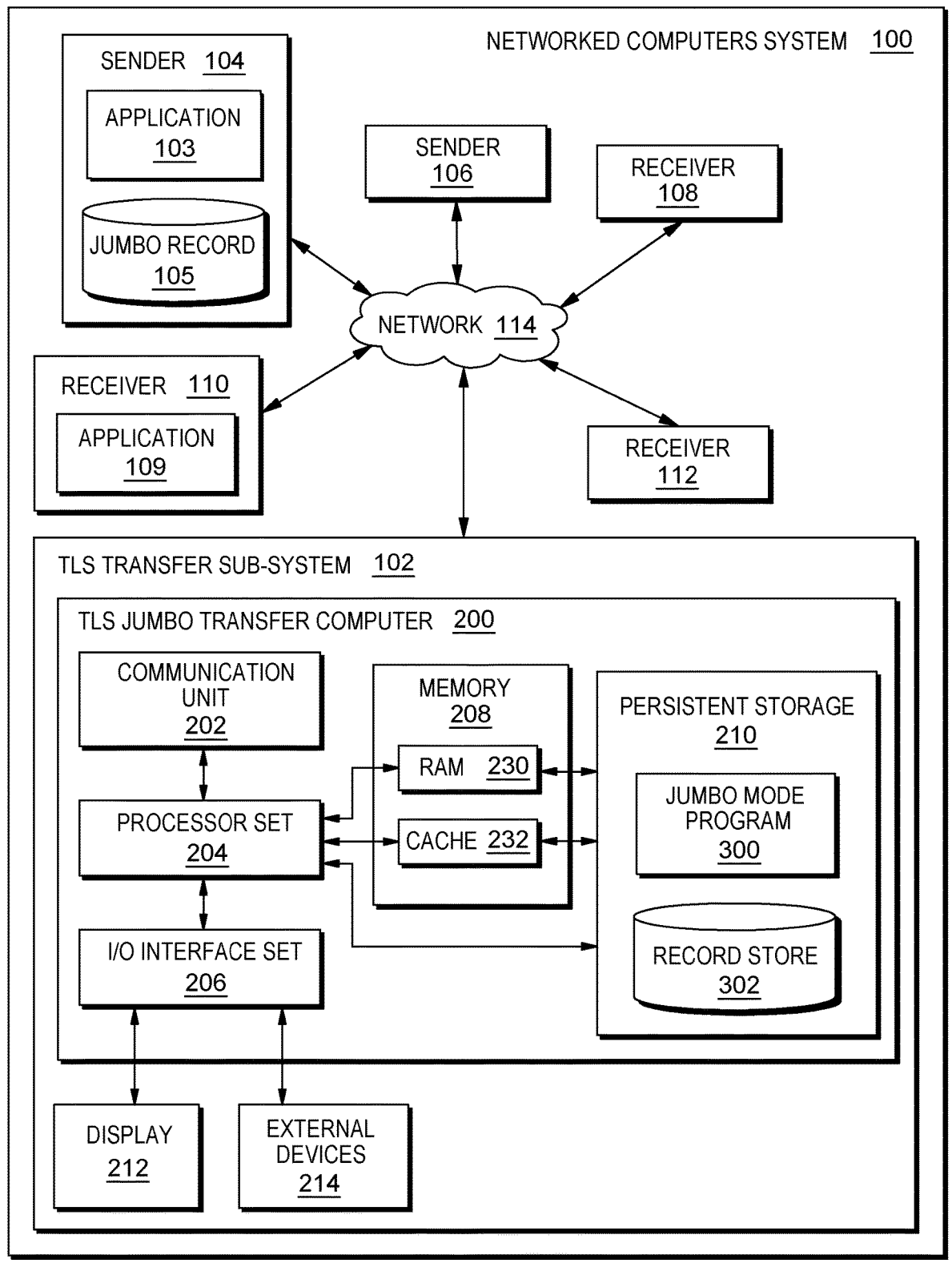
FIG. 1 is a schematic view of a first embodiment of a system according to the present invention.

Establishing a transfer mode between devices for large bulk records over a TLS protocol by fragmenting an encrypted bulk record into a set of pre-defined block sizes for convenient transfer. The pre-defined block sizes are specifically sized to indicate a beginning and an end of the transfer of the associated blocks making up the large bulk record. A middle box is unaware of the association between the blocks and permits transfer according to the maximum transmission unit of the TLS protocol. The fragmented bulk record is reconstructed and decrypted for use after the transfer. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: transport layer security (TLS) transfer sub-system 102; sender sub-systems 104, 106; receiver sub-systems 108, 110, 112; applications 103, 109; jumbo record store 105; communication network 114; TLS jumbo record transfer computer 200; communication unit 202; processor set 204; input/output (I/O) interface set 206; memory device 208; persistent storage device 210; display device 212; external device set 214; random access memory (RAM) devices 230; cache memory device 232; jumbo mode program 300; and jumbo record store 302.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Jumbo mode program 300 operates to establish a transfer mode between devices for large bulk records over a TLS protocol by fragmenting an encrypted bulk record into a set of pre-defined block sizes for convenient transfer. The pre-defined block sizes are specifically sized to indicate a beginning and an end of the transfer of the associated blocks making up the large bulk record. A middle box is unaware of the association between the blocks and permits transfer according to the maximum transmission unit of the TLS protocol. The fragmented bulk record is reconstructed and decrypted for use after the transfer.

Some embodiments of the present invention recognize the following facts, potential problems and/or potential areas for improvement with respect to the current state of the art: (i) TLS records are limited to Maximum Transmission Unit (MTU) of 16K by policy; (ii) the TLS record MTU limit cannot be negotiated upward, but only downward to a set of fixed lower values; (iii) applications often encounter problems associated with bulk data transfers due to the MTU; (iv) the conventional approach to transferring large bulk data adversely impacts overall performance due to TLS record overhead processing; and/or (v) conventional transfers required AES-GCM operation to be performed on each fragment instead of on the bulk data record.

Some embodiments of the present invention are directed to applications that perform bulk data transfer over transport layer security (TLS) protocols.

Conventional bulk data transfer with the current TLS protocol for bulk data exceeding the MTU (maximum transfer unit) of 16k requires breaking the bulk data into fragments and individually applying advanced encryption standard (AES)-Galois/counter mode (GCM) to each fragment. Then, one fragment of the maximum size is sent for each TLS record. The full-speed potential of AES-GCM cannot be reached because it applies to each fragment being transferred instead of the large bulk data size. Each TLS record fragment requires: (i) a new nonce; (ii) additional authenticated data (AAD); and (iii) an encryption operation. For example, in many cases TLS performance when encrypting each fragment of large bulk data is less than 50% of raw Galois/counter mode (GCM) performance. Another option for sending large fragments (e.g. greater than 16k) via TLS protocol is to send the large bulk data regardless of the MTU. This method is not feasible because the middle box is likely to block the large fragments due to the limits imposed by the TLS MTU.

Some embodiments of the present invention are directed to improving the performance of large bulk data transfers over TLS by employing a method including the steps of: (i) opaquely negotiating a "jumbo mode," (ii) performing enciphering, or encrypting, the plain large bulk data in a single AES-GCM operation, and (iii) breaking the encrypted large bulk data into a number of 16K packets plus a final packet below the 16k size, or slightly larger, also referred to as a "non-16K packet."

These "jumbo fragments" are detected by the receiver based on a first standard packet size followed by the final non-standard packet size (such as the non-16K packet). The receiver combines all the jumbo fragments of the large bulk data to recreate the encrypted large bulk data and performs deciphering on the encrypted large bulk data in a single AES-GCM operation to recreate the plain large bulk data. The plain large bulk data is presented as one block to the corresponding application.

Figure 2:
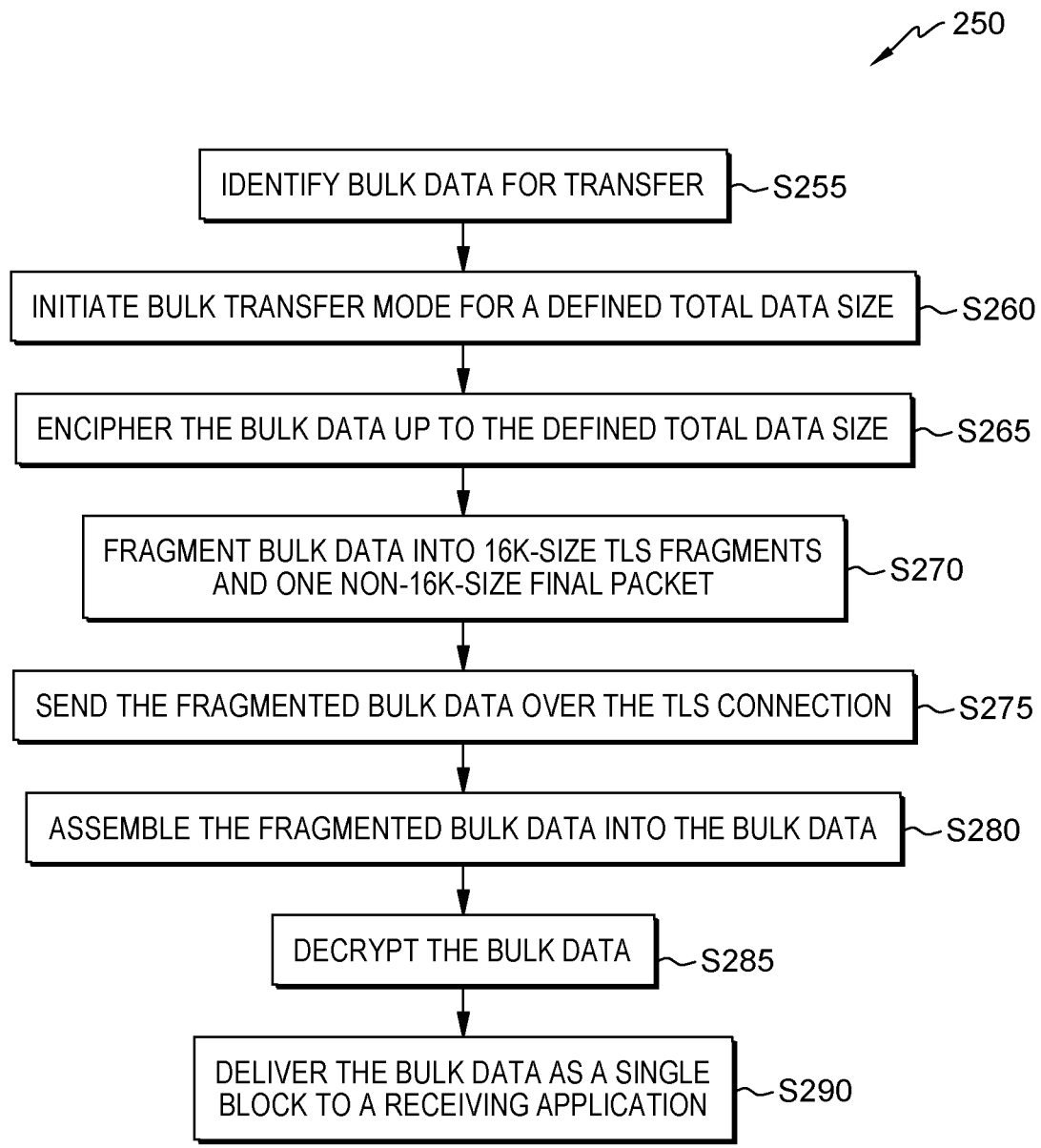
FIG. 2 is a flowchart showing a method performed, at least in part, by the first embodiment system.
Figure 3:
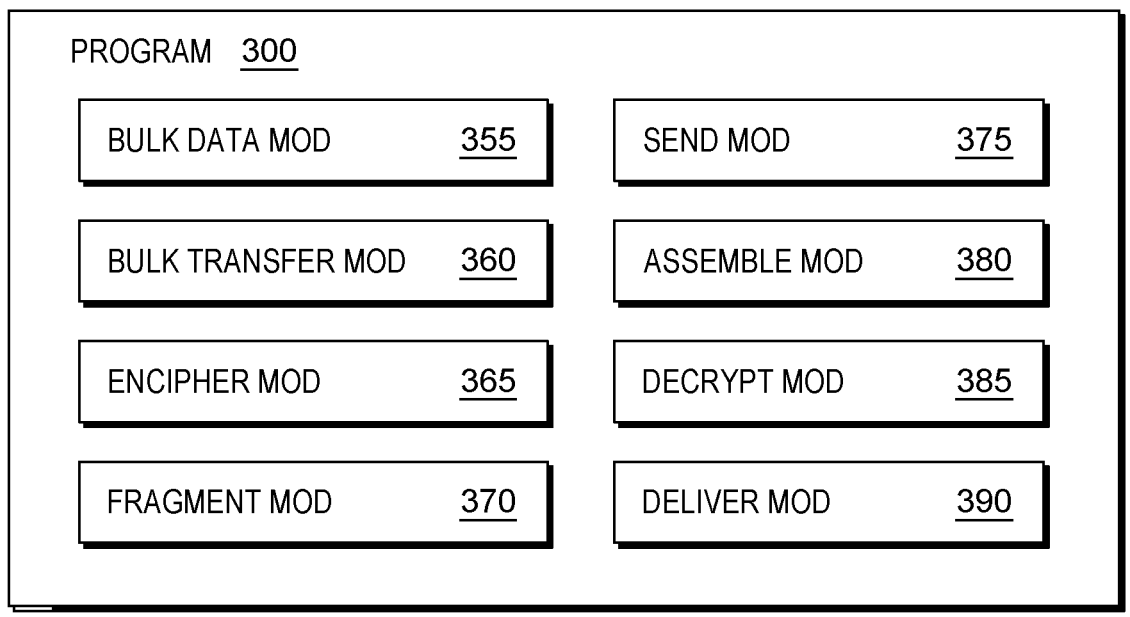
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where bulk data module ("mod") 355 identifies a large bulk dataset, or TLS record, for transfer. The bulk dataset is referred to as "large" because its size exceeds a maximum transmission unit (MTU) value for transfer by a TLS protocol. The bulk dataset may exceed the MTU specified, such as a dataset larger than 16K.

Processing proceeds to step S260, where bulk transfer mod 360 initiates a bulk transfer mode for a pre-defined total data size permitting transmission of the identified large bulk dataset. In this example, a pre-defined total data size is established by policy and for transfers of records below the total data size, TLS transfers may be executed. Alternatively, various levels of data transfer exist based on pre-defined sizes and in this step, the corresponding data transfer level of the identified record is initiated according to established practices for that transfer level.

Processing proceeds to step S265, where encipher mod 365 enciphers the identified bulk data up to the defined total data size. In this example, the size of the identified bulk data is below a maximum data size. In this step, where the identified TLS record is above any pre-defined size for transfer, the record is divided prior to transfer for a multi-portion transfer. Each portion of the bulk dataset is at or below a maximum size for bulk data transfer as defined by some embodiments of the present invention. Each portion, or the entire record if small enough, is encrypted, or enciphered, for secure transmission over the TLS protocol. For example, the entire data record is encrypted according to AES-GCM processing.

Processing proceeds to step S270, where fragment mod 370 fragments the identified bulk dataset into fragments exactly matching the size specified by the MTU and one fragment smaller or larger than the MTU.

Processing proceeds to step S275, where send mod 375 sends the fragments according to a pre-defined order over the TLS connection. The order in which the encrypted record fragments are sent directs the receiving device when the transfer of the entire record is completed, so the fragments are transmitted such that the last fragment is of a size not exactly the MTU value, while the first one and others are the exact size. According to some embodiments of the present invention, the fragments are tagged from a first fragment to a last fragment as the record is fragmented. In that way the particular arrangement of fragments is unnecessary except for the one non-standard size being the last one transmitted.

Processing proceeds to step S280, where assemble mod 380 assembles the transmitted fragments into a single encrypted, or enciphered, large bulk dataset. Assembly of the transmitted fragments is performed while the fragments remain encrypted. In some embodiments of the present invention, the fragments are assembled in the order in which they are received, ending with the non-standard size fragment. Alternatively, the order in which the fragments are assembled is dictated by order-indicating tags embedded with each fragment.

Processing proceeds to step S285, where decrypt mod 385 decrypts the assembled large bulk dataset. In this way, a single encrypting process is performed in step S265 and, now, a single decrypting step is performed to decrypt the bulk data that was transmitted via TLS communications.

Processing ends at step S290, where deliver mod 390 delivers the large bulk dataset as a single record to a receiving application. In this example, sender 104 sends a jumbo record from jumbo record store 105 to receiver 110 for application 109 via TLS communication through network 114 under control of TLS transfer sub-system 102 (FIG. 1) in accordance with the process illustrated in FIG. 2.

Figure 4:
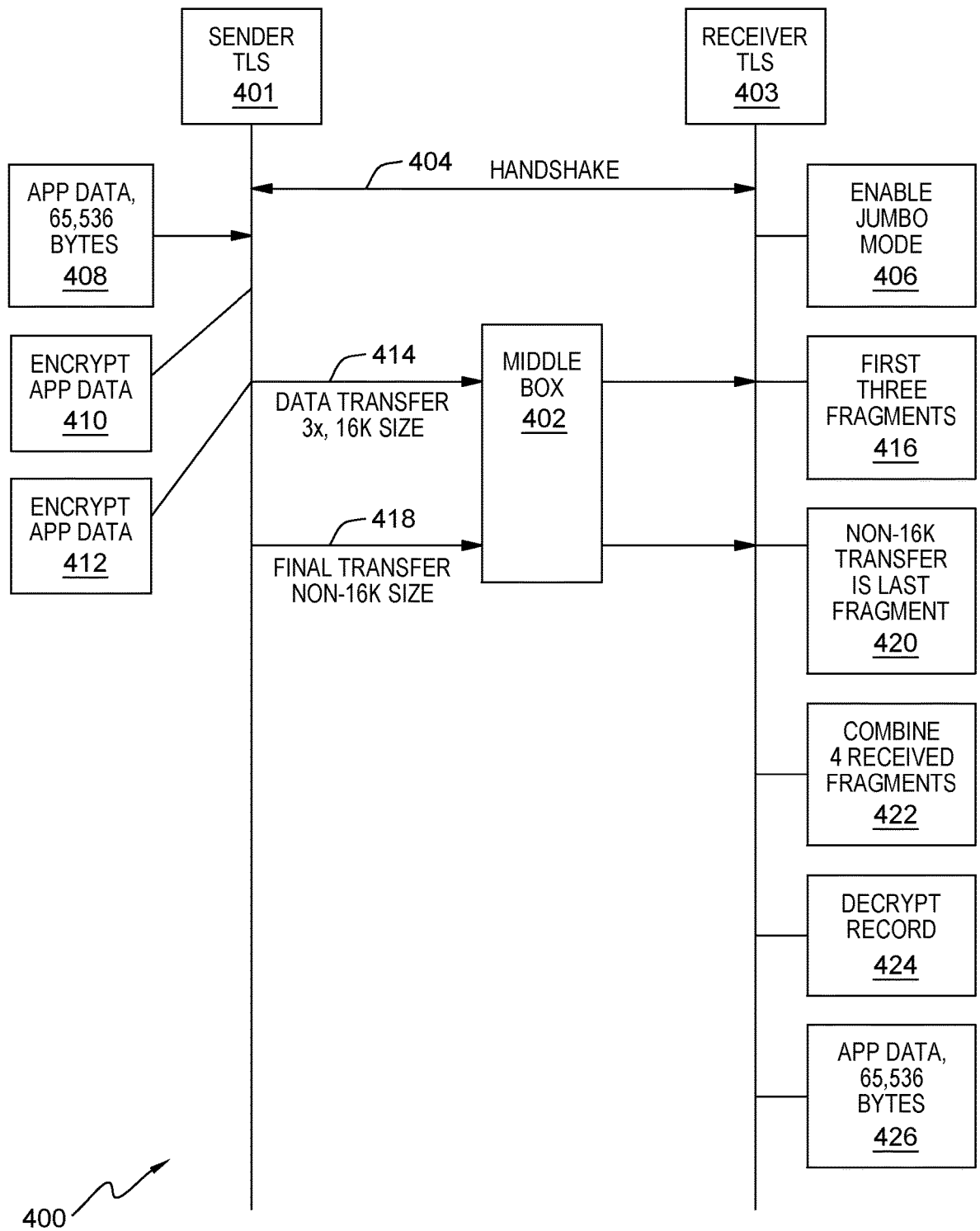
FIG. 4 is a swim diagram view of a second embodiment method according to the present invention.

Further embodiments of the present invention are presented in FIG. 4 and are discussed in the paragraphs that follow.

Some embodiments of the present invention are directed to a method to improve performance of large bulk data transfers over TLS protocol.

By performing enciphering and deciphering as a single AES-GCM operation on the large bulk data being transferred, some embodiments of the present invention provide significant performance benefits over conventional transfer methods.

According to some embodiments of the present invention, the negotiation of TLS "jumbo mode" between peer computing devices is opaque in that a PSK-based (PreShareKey) negotiation is performed.

FIG. 4 shows swim diagram 400 depicting a method according to some embodiments of the present invention. The illustrated process may be performed by software operating in a system such as networked computers system 100 (FIG. 1) stored as program 300. This method will now be discussed, over the course of the following paragraphs, with extensive reference to FIG. 4.

Processing begins where sender TLS 401 wants to send application data 408 to received TLS 403. The application data is a record having the size of 65,536 bytes but the TLS maximum transmission units are set to 16,384 bytes (16K). Accordingly, sender 401 and receiver 403 handshake (404) to negotiate jumbo mode for transferring a record larger than the MTU. Receiver 403 enables jumbo mode (406).

Processing proceeds where the application data record 408 is transferred from sender 401 to receiver 403 via middle box 402 according to TLS protocol having an MTU of 16K.

Processing proceeds to step 410 where the application data record is encrypted via AES-GCM on the bulk record by performing a single GCM operation on the application data record.

Processing proceeds to step 412 where the encrypted data is fragmented into 3 fragments of exactly 16K size and 1 fragment of non-16K size.

Processing proceeds to step 414 where each 16K fragment is delivered to receiver 403 via middle box 402.

Processing proceeds to step 416 where receiver 403 identifies the first of the three fragments is an indication that a jumbo packet is being received starting with the first fragment of exactly 16K. Two additional jumbo packets are received, each being exactly 16K in size.

Processing proceeds to step 418 where the final jumbo fragment is transferred to the receiver.

Processing proceeds to step 420 where the receiver identifies the final jumbo packet by its size being less than less than 16K (TLS MTU) or equal to 16K plus 16 bytes (cipher-overhead). According to some embodiments of the present invention, the receipt of the final jumbo packet deactivates jumbo mode.

Processing proceeds to step 422 where the 4 jumbo packets are combined into a single encrypted jumbo record.

Processing proceeds to step 424 where the single encrypted jumbo record is decrypted to create application data record 408.

Processing proceeds to step 426 where the application data record is received by the receiver.

According to some embodiments of the present invention, the negotiation of TLS "jumbo mode" is opaque in that a GREASE (generate random extensions and sustain extensibility) extension is used to send a signal embedded in a random number. The middlebox device will not interfere with the negotiation of "jumbo mode" between peers because middlebox devices are generally prohibited from blocking GREASE extensions.

According to some embodiments of the present invention only data packets transferred in "jumbo mode" are exactly 16K size followed by a final jumbo fragment of a size less than 16K (TLS MTU) or equal to 16K plus 16 bytes (cipher-overhead). Accordingly, for plain text plus AAD that is exactly 16K, the plain text is padded by 16 bytes to prevent the system from triggering jumbo mode processing when the exactly 16K packet for the plain text is received. See Table 1, below.

TABLE 1

Example size of plain text, encrypted text, and padding for normal and jumbo packets.

| Plain Text Size | Enc Text Size | Jumbo Status | Padding Applied |
|---|---|---|---|
| 8192 | 8192 + 16 | Non Jumbo (Normal packet) | NA |
| 16384 − 16 | 16384 + 16 | Non Jumbo (Normal packet) | Padding 16 bytes |
| 16384 | 16384 + 16 | Non Jumbo (Normal packet) | NA |
| 65536 | 16384, 16384, 16384, 16384 + 16 | Jumbo over 4 records | NA |
| 65536 − 16 | 16384, 16384, 16384, 16384 + 16 | Jumbo over 4 records | Padding 16 bytes on last fragment |

The following example is presented as an example implementation of some embodiments of the present invention. For example, an application using a 256k buffer only has to perform two GCM operations when transferring data under the TLS "jumbo mode." If the transfer was performed under the standard TLS protocol, the application with a 256k buffer would have to perform a minimum of 16 GCM operations.

Some embodiments of the present invention are directed to a method for transferring large bulk data including the steps of (i) set the TLS MTU to 16K; (ii) set the max allowed jumbo fragments (for example, set this value to 8 to allow data with size up to 128k); (iii) negotiate jumbo mode of operation by: (a) sending a client hello grease extension with a random number that signals jumbo mode (OR) (b) using a pre-shared key between the peers; (iv) Peers A and B share a PreShareKey (PSK), which is a known secret value; (v) Peer A sends random number R to Peer B; (vi) Peer B sends pseudo random number R' (which is HMAC(PSK,R)) in replay; (vii) Peer A verifies reply R' using same HMAC (PSK,R) to recognize that the jumbo mode is agreed upon; (viii) Peer A performs AES-GCM on bulk data in a single GCM operation; (ix) Peer A fragments the bulk data into jumbo data fragments of 16k each (in this example, the first (n−1) packets will be of exact size 16k and the last packet will be non-16k, which means less than 16k or equal to 16k plus 16 bytes (including cipher overhead); (x) Peer A send fragments to Peer B; (xi) Peer B collects fragments of exactly 16 K MTU until a non-16 K MTU fragment is received; and/or (xii) Peer B combines all the fragments and then decrypts the combined cipher-text in a single GCM decrypt operation.

As discussed above and illustrated in Table 1, the initial jumbo fragment in its encrypted form is exactly the size of the TLS maximum transmission unit (MTU), which in the example above is 16 kilobytes (K). The last jumbo fragment, which indicates an end of transmission in jumbo mode, is either less than the MTU value or equal to the MTU plus 16 bytes (cipher overhead). For plain text plus additional authenticated data (AAD) transmission that is exactly the MTU value, the plain text is padded by 16 bytes to prevent an interpretation of the plain text transmission as an initial jumbo fragment in jumbo mode. The only time a TLS record of exactly the size of the MTU is present is when jumbo mode is initiated or ongoing. Any non-MTU size TLS record is either an individual record or an indicator of the end of jumbo mode. The data stream will include a series of MTU-sized data fragments and a final non-MTU size data fragment or individual records (normal data) at or above the MTU limit for TLS transmission.

Some embodiments of the present invention are directed to a method for transmitting bulk data over MTU values via TLS including: (i) negotiating a TLS transfer via "jumbo mode;" (ii) encrypting a bulk data record up to a stipulated maximum record size in a single AES-GCM operation where the maximum record size dictates the maximum number of jumbo data fragments to be transferred for one jumbo TLS record; (iii) sending a TLS "jumbo record" divided into packets of exactly 16K and one packet not exactly 16K; (iv) combining the jumbo-record packets into a single bulk data record; (v) decrypting the single bulk data record; and/or (vi) presenting the decrypted bulk data package to a corresponding application. Where negotiating the TLS jumbo mode includes using a GREASE extension containing a random number embedded signal to stop middlebox blocking or using a pre-shared key between peers. An example stipulated maximum record size is 128K, which would be divided into 7 packets of exactly 16K memory and 1 packet of the size 16K plus 16 bytes for cipher-overhead. The first 7 packets are transmitted with the final packet not being exactly 16K in size.

Some embodiments of the present invention are directed to using a chacha stream cipher with any authenticated encryption with associated data (AEAD) for encryption of the bulk data record.

Some embodiments of the present invention are directed to a speed bulk data transfer over TLS using a pre-shared key between peers and sending a TLS record broken up into a series of opaque TLS fragments equal to the maximum transmission unit for the TLS protocol.

Some embodiments of the present invention may include one, or more, of the following features, characteristics and/or advantages: (i) provides performance benefits due to reduced overhead and reduced encryption/decryption operations; (ii) a security advantage is provided where "jumbo mode" provides for one single GCM operation on the large bulk data so it is not susceptible to a ChosenCipherText attack; (iii) transparent to middlebox in that a middlebox device will not block any jumbo fragments because the transmitted records are standard size and appear as normal encrypted application data; (iv) improves performance of applications that require bulk transfer to be exchanged securely over TLS; (v)

Example pseudocode follows:

```
bool jumbo = false;
Buffer combined, currentPacket;
int size = 0;
int TLS_MTU = 16384;
int CIPHER_OVERHEAD = 16;
While (size = readPacket(¤tPacket))
{
    if (size == TLS_MTU) // indicates a jumbo fragment
    {
        jumbo = true;
        combined.append(currentPacket);
    }
    else if(size <= TLS_MTU + CIPHER_OVERHEAD) // indicates a normal packet or last jumbo fragment
    {
        checkAndRemovePaddingasRequired( );
        if (jumbo)
        { // last packet
            combined.append(CurrentPacket);
        }
        break;
    }
    else // packet size cannot be greater than TLS_MTU + CIPHER_OVERHEAD bytes.
    {
        throw invalid_MTU;
    }
} // end while
if(jumbo)
{
    decrypt(combined); // Jumbo
}
else
{
    decrypt(currentPacket); // Normal packet
}
```

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as may be being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
dividing an encrypted record into a set of fragments including equal-size fragments exactly a size of a maximum transmission unit (MTU) according to a transfer layer security (TLS) protocol, the encrypted record exceeding the size of the MTU;
causing a last fragment of the set of fragments to be an unequal size fragment;
establishing a transmission mode for transmitting records exceeding the size of the MTU by a handshake operation between a first device and a second device;
transmitting each fragment of the set of fragments according to the transmission mode indicating an order of transmission from the first device to the second device via the TLS protocol over a communications network, the order of transmission causing the one unequal-size fragment to be transmitted last;
collecting the set of fragments until receipt of the unequal-size fragment is received, the receipt of the unequal-size fragment indicating an end of transmission of the encrypted record;

responsive to determining the end of transmission, assembling the set of fragments to create the encrypted record; and decrypting the encrypted record for processing by the second device.

2. The computer-implemented method of claim 1; further comprising:

identifying a bulk data record for transmission from the first device to the second device;

determining the bulk data record exceeds the size of the MTU; and encrypting the bulk data record to create the encrypted record.

3. The computer-implemented method of claim 2, further comprising:

determining how many equal-size fragments can be divided from the bulk data record;

taking a final-block action to cause a single fragment to be the unequal size fragment, the unequal size fragment being unequal to the size of the MTU.

4. A computer program product comprising a computer-readable storage medium having a set of instructions stored therein which, when executed by a processor, causes the processor to perform a method comprising:

dividing an encrypted record into a set of fragments including equal-size fragments exactly a size of a maximum transmission unit (MTU) according to a transfer layer security (TLS) protocol, the encrypted record exceeding the size of the MTU;

causing a last fragment of the set of fragments to be an unequal size fragment;

establishing a transmission mode for transmitting records exceeding the size of the MTU by a handshake operation between a first device and a second device;

transmitting each fragment of the set of fragments according to the transmission mode indicating an order of transmission from the first device to the second device via the TLS protocol over a communications network, the order of transmission causing the one unequal-size fragment to be transmitted last;

collecting the set of fragments until receipt of the unequal-size fragment is received, the receipt of the unequal-size fragment indicating an end of transmission of the encrypted record;

responsive to determining the end of transmission, assembling the set of fragments to create the encrypted record; and decrypting the encrypted record for processing by the second device.

5. The computer program product of claim 4; further including in the set of instructions a method comprising:

identifying a bulk data record for transmission from the first device to the second device;

determining the bulk data record exceeds the size of the MTU; and encrypting the bulk data record to create the encrypted record.

6. The computer program product of claim 5, further including in the set of instructions a method comprising:

determining how many equal-size fragments can be divided from the bulk data record;

taking a final-block action to cause a single fragment to be the unequal size fragment, the unequal size fragment being unequal to the size of the MTU.

7. A computer system comprising:

a processor set; and a computer readable storage medium;

wherein:

the processor set is structured, located, connected, and/or programmed to run program instructions stored on the computer readable storage medium; and the program instructions which, when executed by the processor set, cause the processor set to perform a method comprising:

dividing an encrypted record into a set of fragments including equal-size fragments exactly a size of a maximum transmission unit (MTU) according to a transfer layer security (TLS) protocol, the encrypted record exceeding the size of the MTU;

causing a last fragment of the set of fragments to be an unequal size fragment;

establishing a transmission mode for transmitting records exceeding the size of the MTU by a handshake operation between a first device and a second device;

transmitting each fragment of the set of fragments according to the transmission mode indicating an order of transmission from the first device to the second device via the TLS protocol over a communications network, the order of transmission causing the one unequal-size fragment to be transmitted last;

collecting the set of fragments until receipt of the unequal-size fragment is received, the receipt of the unequal-size fragment indicating an end of transmission of the encrypted record;

responsive to determining the end of transmission, assembling the set of fragments to create the encrypted record; and decrypting the encrypted record for processing by the second device.

8. The computer system of claim 7; further including in the set of instructions a method comprising:

identifying a bulk data record for transmission from the first device to the second device;

determining the bulk data record exceeds the size of the MTU; and encrypting the bulk data record to create the encrypted record.

9. The computer system of claim 8, further including in the set of instructions a method comprising:

determining how many equal-size fragments can be divided from the bulk data record;

taking a final-block action to cause a single fragment to be the unequal size fragment, the unequal size fragment being unequal to the size of the MTU.

* * * * *